United States Patent [19]

Taguchi et al.

[11] Patent Number: 4,777,550
[45] Date of Patent: Oct. 11, 1988

[54] SHOCK ABSORBING APPARATUS FOR LOADING A MAGNETIC DISC ON A DISC DRIVE

[75] Inventors: Katsuhiko Taguchi; Hiroshi Imai, both of Chofu, Japan

[73] Assignee: Tokyo Juki Industrial Co., Ltd., Japan

[21] Appl. No.: 759,966

[22] Filed: Jul. 29, 1985

[30] Foreign Application Priority Data

Jul. 30, 1984 [JP] Japan .............................. 59-116761[U]

[51] Int. Cl.4 .............................................. G11B 17/02
[52] U.S. Cl. .......................................... 360/97; 360/99
[58] Field of Search ....................................... 360/97–99

[56] References Cited

U.S. PATENT DOCUMENTS 3,416,150 12/1968 Lindberg ................................ 360/97

Primary Examiner—Robert S. Tupper
Attorney, Agent, or Firm—Schwartz & Weinrieb

[57] ABSTRACT

A shock absorbing apparatus for loading a magnetic disc onto a disc drive comprises disc positioning pins equipped with shock absorbing devices which effectively load the magnetic disc smoothly, without shocks. The pins hold a collar in place using a coil spring and a ball placed in a hole drilled into the side of the pin. The collar is thus allowed to move up and down freely, its motion controlled by a sliding disc holder. The collar thus absorbs shocks to the magnetic disc normally encountered when loading such discs on a conventional disc drive.

15 Claims, 3 Drawing Sheets

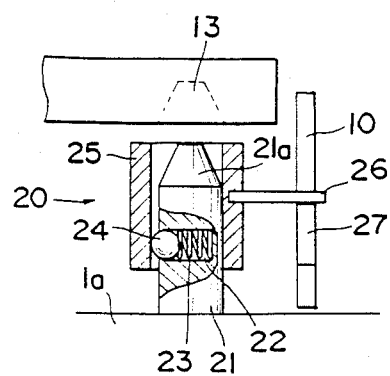
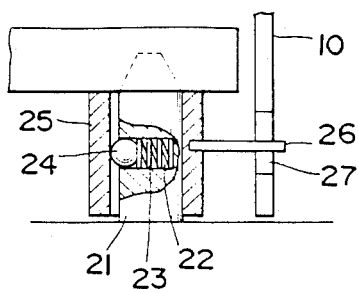
FIG. 1A
FIG. 1B
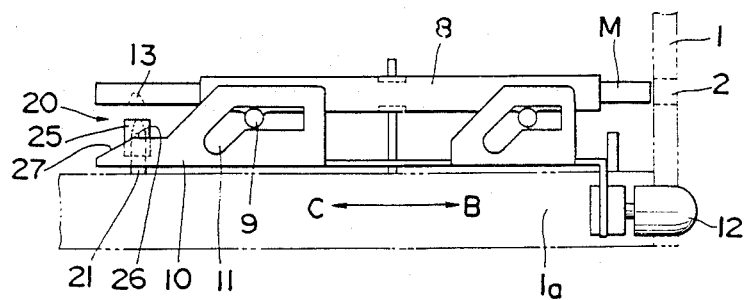
FIG. 2A
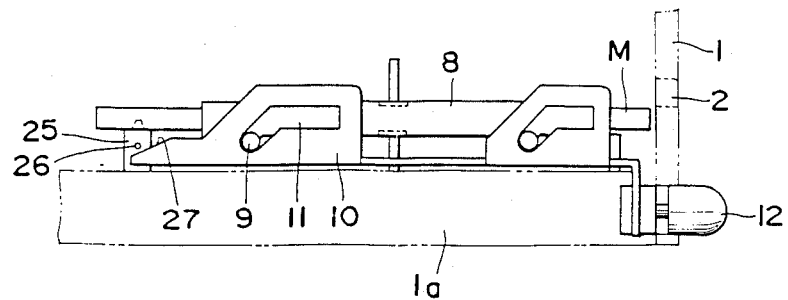
FIG. 2B

SHOCK ABSORBING APPARATUS FOR LOADING A MAGNETIC DISC ON A DISC DRIVE

FIELD OF THE INVENTION

This invention pertains to a disc loading mechanism for a magnetic disc drive. More particularly, the invention pertains to a shock absorbing device to absorb shocks potentially impacting both the magnetic disc and the magnetic recording head. The invention enables the magnetic disc to come into contact with a turn table smoothly, without impacting with considerable force upon the magnetic recording head.

BACKGROUND OF THE INVENTION

Generally, floppy discs are used for computers and certain office automation machines. Cassettes are used for video tape recorders.

One type of disc drive which uses these magnetic discs is designed to transfer the disc downwardly in an instantaneous manner instantaneously when it reaches a pre-set point after being inserted from an inlet. When the disc contacts the turntable as a result of the aforementioned downward motion, there is a possibility of damaging both the disc and the magnetic head.

FIG. 6 illustrates this general type of disc drive. It is comprised of a turntable 3 which draws and sustains a floppy disc (M) inserted from an inlet (2) by using magnetic force, a direct drive motor (4) which rotates the turntable (3), heads (5a, 5b) positioned above and below the floppy disk (M) to read and write records from floppy disk (M), carriages (6a, 6b) positioned above and below floppy disk (M) which support the heads (5a, 5b), a stepping motor (7) which moves the carriages (6a, 6b) in the directions of arrow A, and a spring (6c) which pulls the upper carriage (6a) downward.

A mechanism for enabling the floppy disc (M) to be moved downward after being inserted from the inlet (2) is illustrated in FIG. 7A and FIG. 7B. Referring to FIG. 7A, the floppy disc (M) is inserted from the inlet (2) and enters into a holder (8). The holder is provided with four rollers (9), one each at both sides of and at the front and rear parts of the holder (8). A slider (10) which is disposed upon both sides of holder (8) slides both forwards and backwards and is provided with a groove (11) in which the rollers (9) can slide.

When a floppy disc (M) is inserted into the holder (8) and is advanced to a pre-set position, the slider (10) is moved in the direction of arrow B by stopper members and pulling members which are not illustrated in FIGS. 7A or 7B. The slider (10) is provided with an eject button (12) which is operated from the front side of the disc drive. A pin portion (20) pinpoints and secures the floppy disc with a positioning hole (13) on the floppy disc cartridge or case. When the floppy disc moves downward and loads on the disc drive, the correct position of disc is secured.

Positioning holes (13) are provided at four corners of the floppy disc case. The pin portions (20) are located at four places corresponding to the pinpoint holes (13). Accordingly, when the floppy disc (M) is inserted from the inlet (2) and is advanced into the holder (8) to the pre-set position (FIG. 7A), the slider (10) moves in the direction of arrow B, thereby causing the holder (8) to move downward by the sliding engagement between the groove (11) and the roller (9). (FIG. 7B)

In this case, the pin portion (20) fits into the positioning hole (13) and the correct position of the floppy disc is secured. As mentioned above, when the floppy disc (M) moves downwardly in an instantaneous manner with the holder (8), and touches the lower head (5b) with some shock, there is a possibility of damaging the floppy disc (M) or the head (5b).

To avoid this shock, some manufacturers adopt an air damper which is located at the holder (8) (not illustrated on the drawing). These devices absorb shocks by a damping action. But such a damping action is not applied directly to the magnetic disc (M), but rather to the holder (8). Thus, a satisfactory damping action is not performed.

OBJECT OF THE INVENTION

To solve the above mentioned problems, the present invention has as its objective the provision of the floppy disc positioning pins such that the shock absorbing means are applied directly to the floppy disc as it moves downward, thus more effectively absorbing such shocks. Also, the shock absorbing means act just before the floppy disc touches the head, so the loss time caused by providing the shock absorbing means is minimized.

SUMMARY OF THE INVENTION

The present invention provides a shock absorbing apparatus at a positioning pin unit thus enabling loading of the magnetic disc at the correct position without shock. The shock absorbing device is designed to release the shock exerted when the magnetic disc and the head come into contact, thereby directly absorbing the shock from the magnetic disc and consequently, protecting the magnetic disc and the head from damage. Also, the shock absorbing apparatus acts just before the magnetic disc contacts the head, thereby minimizing the loss-time caused by providing the shock absorbing function.

BRIEF DESCRIPTION OF THE DRAWINGS

The invention will be described in greater detail below by way of reference to the following drawings in which:

FIG. 1A and FIG. 1B are partially cut views of shock absorbing means according to the instant invention;

FIG. 2A and FIG. 2B are side views of the transferring mechanism of the floppy disc including the shock absorbing means as illustrated in FIG. 1A and FIG. 1B;

DETAILED DESCRIPTION OF THE DRAWINGS

Figure 6:
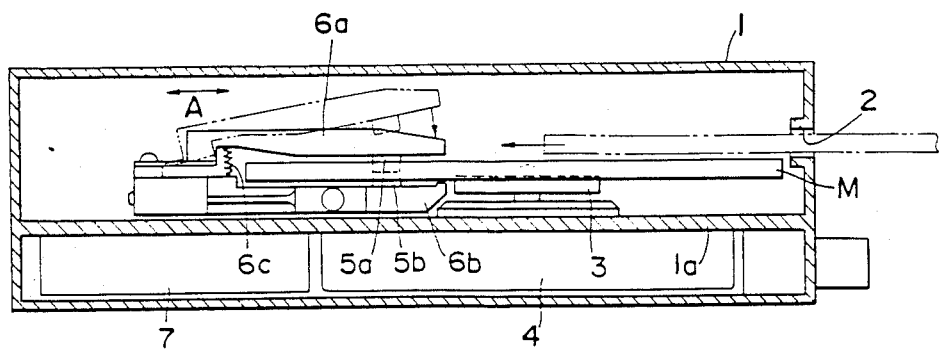
FIG. 6 is an elevation of the inside configuration of a disc drive including a floppy disc.
Figure 7A:
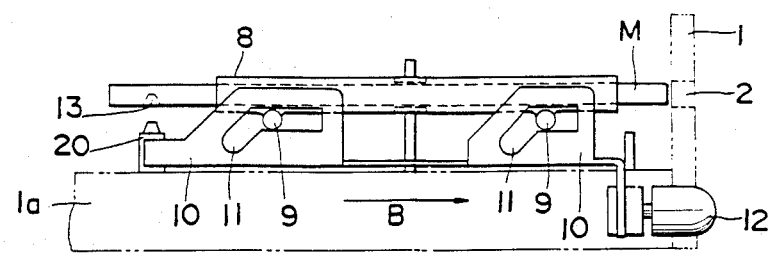
FIGS. 7A and 7B are elevations illustrating a conventional transferring mechanism for floppy disc drives.
Figure 7B:
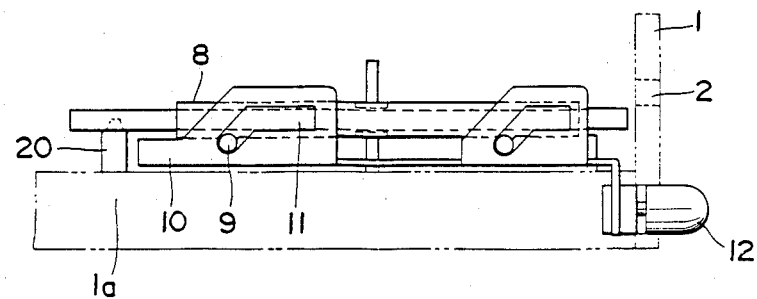

FIGS. 1A to 5 illustrate examples of the present invention. The examples of FIGS. 1A to 5 are illustrated with reference to a conventional floppy disc drive such as illustrated in FIGS. 6, 7A and 7B.

FIG. 1A and FIG. 1B are the partially cut views of the shock absorbing means. In these drawings, numeral 21 denotes a positioning pin having a pointed portion (21a). The positioning pin (21) is fixed on a base plate (1a) of the disc drive (1). Within the positioning pin (21), a hole (22) is radially drilled from a circumferential side portion toward the center. A ball (24) is inserted in the hole (22) along with a coil spring (23) which pushes the ball radially outwardly, thereby holding the ball in place.

Numeral 25 denotes a cylindrically shaped collar, its inside wall being in contact with the radially outwardly biased ball (24). The collar (25) mounts over the positioning pin (21) and freely slides upwards or downwards. The diameter of the shock absorbing collar (25) is designed to be larger than the diameter of the opening of the positioning hole (13).

Numeral 26 denotes a guide lever which extends radially outwardly from collar 25 and rests upon a cam portion (27) formed at the rear upper part of the slider (10). The positioning pin assembly is thus comprised of the pin (21) and the collar (25) and the other parts cooperating with the shock absorbing means.

Referring to FIGS. 1A, 1B, 2A, and 2B, the action of the above example is illustrated. When the floppy disc (M) is inserted from the inlet (2) (FIG. 2A) into the holder (8) and is advanced to a pre-set position, the slider (10) moves in the direction of arrow B by the action of a stopper and pulling mechanism (not shown). Before inserting the disc (FIGS. 1A and 2A), the shock absorbing collar (25) covers the upper portion of the positioning pin (21a) and the guide lever (26) is pushed upward by the cam portion (27) formed on the slider (10). As the slider (10) moves in the direction of the arrow B, the rollers (9), with their ends inserted in the grooves (11), are forced to move downward, and simultaneously the holder (8) is moved downward. At this time, the casing of the floppy disc (M) touches the upper side of the collar (25) just before it touches the head (5b) (FIG. 6). Since the inside wall of the collar (25) is contacted by the ball (24) under the force of spring (23), and the frictional force is applied to the downward movement of the collar, the floppy disc (M) which is moving downward receives a decelerating action and is transferred downward slowly (FIGS. 1A to 2B). Simultaneously, the collar (25) is moved downward, exposing the pointed portion (21a), which falls into the positioning hole (13) provided on the floppy disc (M). Thereby, the floppy disc (M) contacts the head (5b) softly, and is placed at the correct position with the action described above (FIGS. 1B and 2B). When the floppy disc is to be removed, the eject button (12) is pushed, causing the slider to be moved in the direction of arrow C, and to lift the roller (9) by the sliding engagement with the groove (11). In this case, the guide lever (26) which is a part of the collar (25) is lifted upward by the cam portion (27) of slider (10), the collar (25) covers the pointed portion (21a), and the original position is restored (FIG. 1A).

Figure 3:
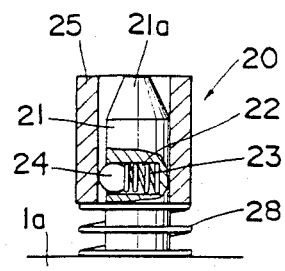
FIGS. 3, 4, and 5 are partially cut views of these different examples of shock absorbing means according to the invention.
Figure 4:
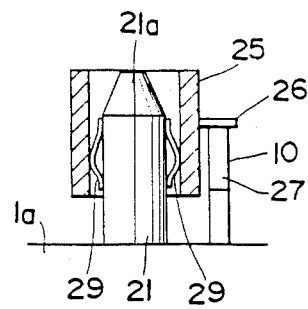
Figure 5:
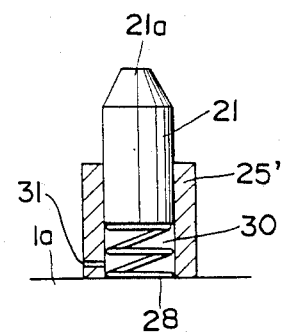

Alternate examples of the shock absorbing means are illustrated in FIG. 3 to FIG. 5.

A second example is illustrated in FIG. 3. In FIG. 3, a spring (28) supports the shock absorbing collar (25), thereby effectuating the shock absorbing action. Also, in the example of FIG. 3, the restoring action of the collar to its original position may be performed without motion relative to the slider (10).

The third example of the invention is illustrated by way of reference to FIG. 4. In the example of FIG. 4, leaf springs (29) are used to engage the inside surface of the collar (25). In use, the leaf springs (29) of FIG. 4 provide the same damping function as the ball and coil spring of the embodiments of FIGS. 1A, 2A and 3.

A fourth example of the invention is illustrated in FIG. 5. In the embodiment of FIG. 5, the collar (25') is fixed on the base 1a and the positioning pin (21) moves upwards and downwards. An air damper chamber (30) is defined within the bottom portion of the collar with a dampening control aperture (31) defined within a lower sidewall portion of collar (25'). In this embodiment, the spring (28) is placed in the air damper section to effectuate the damping action and to restore the positioning pin (21) without use of a slider (10) (See FIGS. 2A and 2B). In this fourth example (FIG. 5), the shock absorbing mechanism acts after the positioning pin (21) and floppy disc (M) are pinpointed together (see FIGS. 2A and 2B).

As many widely different embodiments of the invention may be made without departing from the spirit and scope thereof, it is to be understood that the invention is not limited to the specific embodiments herein described except as defined in the appended claims. More particularly, in the examples described herein, the invention is described by way of reference to floppy disc drives. However, it is clear that the present invention is not limited to this apparatus.

We claim:

1. In a magnetic disc drive wherein a magnetic disc, disposed within a case, is inserted through an inlet of said magnetic disc drive and moved toward a magnetic head, a shock absorbing system for reducing impact shocks imparted to said magnetic disc and said magnetic head when said magnetic disc achieves contact engagement with said magnetic head, comprising:

sliding means, having a cam portion formed thereon, for moving said magnetic disc from an elevated insertion position to a lowered loaded position at which said magnetic disc will be in contact engagement with said magnetic head;

positioning hole means defined within said magnetic disc case;

positioning pins disposed within said magnetic disc drive for engaging said positioning hole means of said magnetic disc case so as to accurately position said magnetic disc relative to said magnetic head;

a collar annularly surrounding each one of said positioning pins and provided with a cam follower guide level engageable with said cam portion of said sliding means so as to be movable relative to said each one of said positioning pins between a first projected position, corresponding to said elevated insertion position of said sliding means and said magnetic disc, at which each one of said collars will engage said magnetic disc prior to full engagement of said each one of said positioning pins within said positioning hole means of said magnetic disc case and said contact engagement between said magnetic disc and said magnetic head, and a second retracted position, corresponding to said lowered loaded position of said sliding means and said magnetic disc, at which said each one of said positioning pins will be fully engaged within said positioning hole means of said magnetic disc and said magnetic disc will be in said contact engagement with said magnetic head; and means defined between said each one of said movable collars and said each one of said positioning pins for frictionally dampening said movement of said each one of said movable collars between said first projected and second retracted positions whereby said magnetic disc will be moved toward and into said contact engagement with said magnetic head in a controlled, shock-free manner, said frictionally dampening means comprising a radial bore defined within said each one of said positioning pins, a spring disposed within each one of said bores of said each one of said positioning pins, and a ball interposed between said each one of said springs and the interior wall surface of said each one of said movable collars so as to be pressed into frictional contact with said each one of said interior wall surfaces of said each one of said movable collar under the influence of said each one of said springs of said each one of said positioning pins whereby said frictional dampening movement of said each one of said movable collars relative to said each one of said positioning pins is achieved.

2. A system as set forth in claim 1, wherein:
said positioning hole means defined within said magnetic disc case have the configuration of a truncated cone; and
the upper portion of said each one of said positioning pins has the configuration of a truncated cone so as to match said truncated cone configuration of said positioning hole means of said magnetic disc case.

3. A system as set forth in claim 1, wherein:
said cam follower guide lever of said each one of said movable collars extends radially outwardly from said each one of said movable collars; and
said cam portion of said sliding means comprises an inclined portion of said sliding means disposed beneath said radially outwardly extending cam follower guide lever of said each one of said movable collars.

4. A system as set forth in claim 1, wherein:
said spring disposed within said each one of said radial bores is a coil spring.

5. In a magnetic disc drive wherein a magnetic disc, disposed within a case, is inserted through an inlet of said magnetic disc drive and moved toward a magnetic head, a shock absorbing system for reducing impact shocks imparted to said magnetic head and said magnetic disc when said magnetic disc achieves contact engagement with said magnetic head, comprising:
sliding means, having a cam portion formed thereon, for moving said magnetic disc from an elevated insertion position to a lowered loaded position at which said magnetic disc will be in contact engagement with said magnetic head;
positioning hole means defined within said magnetic disc case;
positioning pins disposed within said magnetic disc drive for engaging said positioning hole means of said magnetic disc case so as to accurately position said magnetic disc relative to said magnetic head;
a collar annularly surrounding each one of said positioning pins and provided with a cam follower guide lever engageable with said cam portion of said sliding means so as to be movable relative to said each one of said postioning pins between a first projected position, corresponding to said elevated insertion position of said sliding means and said magnetic disc, at which each one of said collars will engage said magnetic disc prior to full engagement of said each one of said positioning pins within said positioning hole means of said magnetic disc case and said contact engagement between said magnetic disc and said magnetic head, and a second retracted position, corresponding to said lowered loaded position of said sliding means and said magnetic disc, at which said each one of said positioning pins will be fully engaged within said positioning hole means of said magnetic disc and said magnetic disc will be in said contact engagement with said magnetic head; and
means defined between said each one of said movable collars and said each one of said positioning pins for frictionally dampening said movement of said each one of said movable collars between said first projected and second retracted positions whereby said magnetic disc will be moved toward and into said contact engagement with said magnetic head in a controlled, shock-free manner, said frictionally dampening means comprising spring means disposed within the annular space defined between said each one of said positioning pins and said each one of said annularly surrounding collars and mounted upon said each one of said positioning pins so as to extend radially outwardly from said each one of said positioning pins into engagement with the interior wall surface of said each one of said movable collars so as to frictionally dampen said movements of said each one of said movable collars relative to said each one of said positioning pins.

6. A system as set forth in claim 5, wherein:
said spring means comprises a plurality of leaf springs.

7. A system as set forth in claim 5, wherein:
said positioning hole means defined within said magnetic disc case have the configuration of a truncated cone; and
the upper portion of said each one of said positioning pins has the configuration of a truncated cone so as to match said truncated cone configuration of said positioning hole means of said magnetic disc case.

8. A system as set forth in claim 5, wherein:
said cam follower guide lever of said each one of said movable collars extends radially outwardly from said each one of said movable collars; and
said cam portion of said sliding means comprises an inclined portion of said sliding means disposed beneath said radially outeardly extending cam follower guide lever of said each one of said movable collars.

9. In a magnetic disc drive wherein a magnetic disc, disposed within a case, is inserted through an inlet of said magnetic disc drive and moved toward a magnetic head, a shock absorbing system for reducing impact shocks imparted to said magnetic head and said magnetic disc when said magnetic disc achieves contact engagement with said magnetic head, comprising:
positioning home means defined within said magnetic disc case;
positioning pins disposed within said magnetic disc drive for engaging said positioning hole means of said magnetic disc case so as to accurately position said magnetic disc relative to said magnetic head;
a collar annularly surrounding each one of said positioning pins so as to be movable relative to said each one of said positioning pins between a first projected position at which each one of said collars will engage said magnetic disc prior to full engagement of said each one of said positioning pins within said positioning hole means of said magnetic disc case and said contact engagement between said magnetic disc and said magnetic head, and a second retracted position at which said each one of said positioning pins will be fully engaged within said positioning hole means of said magnetic disc case and said magnetic disc will be in said contact engagement with said magnetic head; and means defined between said each one of said movable collars and said each one of said positioning pins for dampening said movement of said each one of said movable collars between said first projected and second retracted positions whereby said magnetic disc will be moved toward and into said contact engagement with said magnetic head in a controlled, shock-free manner, said dampening means comprising a radial bore defined within said each one of said positioning pins, spring means disposed within each one of said radial bores of said each one of said positioning pins, a ball interposed between said each one of said spring means and the interior wall surface of said each one of said movable collars so as to be biased radially outwardly into frictional contact with said each one of said interior wall surfaces of said each one of said movable collars under the influence of said each one of said spring means of said each one of said positioning pins, and second spring means annularly surrounding a lower portion of each one of said positioning pins and interposed between a lower portion of said each one of said movable collars and said magnetic disc drive whereby said dampening movement of said each one of said movable collars relative to said each one of said positioning pins is achieved.

10. A system as set forth in claim 9, wherein:
said spring means of said each one of said positioning pins comprises a coil spring.

11. A system as set forth in claim 9, wherein:
said second spring means is a coil spring.

12. A system as set forth in claim 9, wherein:
said positioning hole means defined within said magnetic disc case have the configuration of a truncated cone; and the upper portion of said each one of said positioning pins has the configuration of a truncated cone so as to match said truncated cone configuration of said positioning hole means of said magnetic disc case.

13. In a magnetic disc drive wherein a magnetic disc, disposed within a case, is inserted through an inlet of said magnetic disc drive and moved toward a magnetic head, a shock absorbing system for reducing impact shocks imparted to said magnetic head and said magnetic disc when said magnetic disc achieves contact engagement with said magnetic head, comprising:

positioning hole means defined within said magnetic disc case;

positioning pins disposed within said magnetic disc drive for engaging said positioning hole means of said magnetic disc case so as to accurately position said magnetic disc relative to said magnetic head;

a collar annularly surrounding each one of said positioning pins and fixedly mounted upon said magnetic disc drive;

said each one of said positioning pins being movable relative to said each one of said collars between a first projected position at which said each one of said positioning pins will engage said magnetic disc prior to said contact engagement between said magnetic disc and said magnetic head, and a second retracted position at which said each one of said positioning pins will be fully engaged within said positioning hole means of said magnetic disc case and said magnetic disc will be in said contact engagement with said magnetic head; and means defined between said each one of said collars and said each one of said movable positioning pins for dampening said movement of said each one of said movable positioning pins between said first projected position and said second retracted position whereby said magnetic disc will be moved toward and into said contact engagement with said magnetic head in a controlled, shockfree manner, said dampening means comprising an enclosed air chamber defined beneath the bottom portion of said each one of said positioning pins and said magnetic disc drive, and within said each one of said annular collars fixedly mounted upon said magnetic disc drive, spring means disposed within each of said enclosed air chambers, and an air control aperture defined within a sidewall portion of said each one of said annular collars whereby said dampening movement of said each one of said movable positioning pins relative to said each one of said collars is achieved by said spring means and control of the air within said enclosed air chamber through said air control aperture.

14. A system as set forth in claim 13, wherein:
said positioning hole means defined within said magnetic disc case have the configuration of a truncated cone; and the upper portion of said each one of said positioning pins has the configuration of a truncated cone so as to match said truncated cone configuration of said positioning hole means of said magnetic disc case.

15. A system as set forth in claim 13, wherein:
said spring means disposed within each one of said collars is a coil spring.

* * * * *